(12) United States Patent
Blomenhofer et al.

(10) Patent No.: US 8,498,803 B2
(45) Date of Patent: Jul. 30, 2013

(54) ARRANGEMENT AND METHOD FOR AIR TRAFFIC MANAGEMENT AND/OR FLIGHT CONTROL OF AIRCRAFT

(75) Inventors: Helmut Blomenhofer, Uhldingen (DE); Holger Neufeldt, Vaihingen/Enz (DE)

(73) Assignee: Thales Alenia Space Deutschland GmbH (DE)

( * ) Notice: Subject to any disclaimer, the term of this patent is extended or adjusted under 35 U.S.C. 154(b) by 344 days.

(21) Appl. No.: 12/921,438

(22) PCT Filed: Jan. 10, 2009

(86) PCT No.: PCT/EP2009/000095
§ 371 (c)(1),
(2), (4) Date: Sep. 8, 2010

(87) PCT Pub. No.: WO2009/112112
PCT Pub. Date: Sep. 17, 2009

(65) Prior Publication Data
US 2011/0015852 A1   Jan. 20, 2011

(30) Foreign Application Priority Data
Mar. 10, 2008  (DE) .......................... 10 2008 013 357

(51) Int. Cl.
*G06F 19/00* (2011.01)
(52) U.S. Cl.
USPC ........................................................... 701/120
(58) Field of Classification Search
USPC ................... 701/2, 3, 13, 120, 412, 484, 531
See application file for complete search history.

(56) References Cited

U.S. PATENT DOCUMENTS

| | | | |
|---|---|---|---|
| 5,890,079 A | 3/1999 | Levine | |
| 6,044,323 A | 3/2000 | Yee et al. | |
| 2003/0137444 A1* | 7/2003 | Stone et al. | 342/30 |
| 2006/0008087 A1 | 1/2006 | Olive | |

(Continued)

FOREIGN PATENT DOCUMENTS

| DE | 102005031439 A1 | 1/2007 |
|---|---|---|
| EP | 2056272 A2 | 6/2009 |

(Continued)

OTHER PUBLICATIONS

Sheridan, Iridium may serve as ADS-B backup in Alaska, www.ainonline.com/aviation-news/aviation-international-news/2007-02-01/iridium-may-serve-ads-b-backup-alaska, Feb. 1, 2007.

(Continued)

*Primary Examiner* — Kim T Nguyen
(74) *Attorney, Agent, or Firm* — Donald R. Boys; Central Coast Patent Agency, Inc.

(57) ABSTRACT

The invention relates to an air traffic control of aircraft. At least one transmission station in an aircraft transmits a broadcast signal received by at least one receiving station and further transmits at least a part of the data contained in the broadcast signal to a central station or other organizations. At least part of the receiving stations are designed as satellite receiving stations, wherein the broadcast signal transmitted by the at least one transmission station to be secured is received by at least one of the satellite receiving stations and at least part of the data contained in the broadcast signal is further transmitted via a radio transmission route to a satellite ground control station and further to the air traffic control central station or another organization.

16 Claims, 3 Drawing Sheets

U.S. PATENT DOCUMENTS

| | | | |
|---|---|---|---|
| 2006/0040612 A1* | 2/2006 | Min | 455/12.1 |
| 2006/0119515 A1 | 6/2006 | Smith | |
| 2007/0088467 A1 | 4/2007 | Knotts | |
| 2008/0001819 A1* | 1/2008 | Cohen et al. | 342/357.16 |

FOREIGN PATENT DOCUMENTS

| | | |
|---|---|---|
| WO | 0233436 A2 | 4/2002 |
| WO | 02101696 | 12/2002 |
| WO | 2007143478 A2 | 12/2007 |

OTHER PUBLICATIONS

Garold, ADS-B: Will it be filled in?, www.aviationtoday.com/av/commercial/ADS-B-Will-lt-Be-Filled-In__791.html, Mar. 1, 2006.

Gaubert et al., Aeronautical Surveillance & Planning by Advanced Satellite-Implemented Applications, Specific Targeted Research Project, Jul. 3, 2006, ASPASIA.

Unknown, Minimum Operational Performance Standards for 1090 MHz Extended Squitter Automatic Dependent Surveillance-Broadcast (ADX-B) and Traffic Infromation Services—Broadcast (TIS-B), European Organisation for C9vil Aviation Equipment, Dec. 2009, France.

Gayraud, Enabling technologies, ASAS-TN Seminar, Oct. 11-13, 2004, Brighton.

Dunstone et al., ADS-B Introduction/Tutorial, Apanpirg ADS-B Task Force Seminar, Oct. 24-25, 2005, Nadi, Fiji.

Chang et al., The Story of Mode S, MIT, Dec. 15, 2000, US.

Boisvert et al., ADS-Mode System Overview, MIT Lincoln Laboratory, MIT Libraries, Oct. 25-28, 1993, 0-7803-1343-7/93, IEEE, US.

Hammond et al., The Implications of Self-Reporting Systems for Maritime Domain Awareness, Technical Memorandum, Defence R&D Canada—Atlantic, Dec. 2006, Canada.

Galati et al., Satellite Systems for Next Generation Air Traffic Management, Proceeding of the AIAA/ESA Workshop on International Cooperation in Satellite Communications, Mar. 27-29, 1995, The Netherlands.

Hoye et al., Space-based AIS for global maritime traffic monitoring, Norwegian Defence Research Establishment, Feb. 2, 2006, Elsevier Ltd.

Galati et al., Study of an Integrated Communication, Navigation and Surveillance Satellite System for Air Traffic Management, CIE International Conference, Oct. 8-10, 1996, Beijing.

\* cited by examiner ial application PCT/EP/2009/000095, filed Jan. 10, 2009, which claims priority to German patent application serial number 10 2008 003 357.4, which was filed on Oct. 10, 2008, both of which are incorporated herein in its entirety, at least by reference.

BACKGROUND OF THE INVENTION

1. Field of the Invention

The present invention relates to an air traffic management and/or flight control arrangement for aircraft.

2. Description of Related Art

From the prior art, an air traffic management and/or flight control arrangement is known by the title Automatic Dependent Surveillance-Broadcast (ADS-B) (compare the RTCA Do-260A standard of 10 Apr. 2003 "Minimum Operational Performance Standard for 1090 MHz Extended Squitter Automatic Dependent Surveillance-Broadcast (ADS-B) and Traffic Information Services-Broadcast (TIS-B), Volume I (Main Part) and Volume II (Appendices)"). With ADS-B, an aircraft independently, that is to say without having been caused to do so from the outside, periodically transmits its identification, position, speed and flight direction and other information as a broadcast signal. For this purpose, at least one suitable transmitting station (a so-called Mode S Extended Squitter) is arranged in the aircraft. In addition, the aircraft has suitable computing means for determining, collecting, possibly preprocessing and editing the data to be transmitted in the aircraft for the transmission as broadcast signal. The broadcast signal is preferably repeated twice per second.

On the ground of the known ADS-B air traffic management and/or flight control arrangement, a plurality of receiving stations spaced apart from one another are arranged which can receive the broadcast signal of the Mode S Extended Squitters of the aircraft. The data and information contained in the broadcast signal are forwarded to an air traffic management and/or flight control center where they can be received, possibly processed and edited and then made available to users. The data of the individual aircraft, present in the air traffic management and/or flight control center can be utilized for air traffic management and/or flight control measures.

The position information of an aircraft originates from an arbitrary source for global navigation, such as, for example, from Global Positioning System (GPS) satellites, on board the aircraft. Naturally, other satellite-based positioning systems (e.g. GLONASS (Russian), Euteltracs (European, especially for long-distance traffic), Galileo (European), MTSAT (Japanese) or Compass (Chinese)) can also be used for determining the position of the aircraft.

The broadcast signal of an aircraft can also be received by other aircraft within range of the broadcast signal if they have a suitable receiving station. In each aircraft, flight information of other aircraft in the surroundings can thus be available which can be output to the pilot and used for avoiding collisions.

The ground-based ADS-B arrangement of air traffic management for indicating the flight movements in the airspace, known from the prior art, is however available only in those regions which have sufficient coverage with suitable receiving stations. Depending on the flying altitude (e.g. 10 000 meters) of the aircraft, the receiving stations arranged on the ground have a range of up to 400 kilometers along a virtual line of sight to the aircraft so that they can in each case cover an approximately circular receiving area having a diameter of up to 800 kilometers. To be able to provide ADS-B in large regions area-wide also for low flying altitudes, a multiplicity of ADS-B ground receiving stations are required. In addition, arranging ADS-B ground stations in inaccessible and remote terrain is expensive. Complete global surveillance with radar installations and/or ADS-B ground stations is impossible or impracticable especially in oceanic regions and/or in very remote and thinly settled regions (e.g. polar regions, Tierra del Fuego, etc.).

An aircraft flying, for example, from the Caribbean to Portugal leaves the range of current radar surveillance after only a few miles from the coast and is then only connected to the various air traffic managements by radio. It is only shortly before it reaches the Portuguese Azores that it is acquired again after a relatively long time by an air traffic management radar when it has entered e.g. the flight surveillance area of Portuguese air traffic management (NAV Portugal or FIR Lisboa).

In addition, a non-homogeneous air traffic management infrastructure between the well equipped airspaces (e.g. USA and Europe) and airspaces in which only procedural air traffic management (ATM) is possible results in a reduction of the ATM capacities also in the well equipped airspaces. This occurs since international aircraft must have priority before regional aircraft in flight control. The entry of one or more international aircraft into the surveillance area is only announced shortly before it is reached and has effects on at least a part of the regional air traffic. Planning of the flight control of the regional air traffic is not possible since it is not known when exactly international aircraft enter into the surveillance area of the air traffic management authority from non-radar or ADS-B-monitored regions (seas or oceans).

BRIEF SUMMARY OF THE INVENTION

In one embodiment of the invention an air traffic management and/or flight control arrangement for aircraft is provided, comprising at least one transmitting station in an aircraft to be managed, and a number of receiving stations spaced apart from one another which are connected to an air traffic management and/or a flight control center. The at least one transmitting station of the aircraft to be managed and/or to be controlled transmits a broadcast signal, at least one of the receiving stations receives the broadcast signal and forwards at least a part of the data contained in the broadcast signal to the air traffic management and/or the flight control center or other organizations, characterized in that at least one part of the receiving stations is configured in such a manner that the one part of the receiving stations receive a 1090 MHz broadcast signal of a transmitting station, configured as Mode S Extended Squitter, of the aircraft to be managed, and forward at least a part of the data contained in the broadcast signal via a radio transmission link to a satellite ground control station and onward to the air traffic management and/or the flight control center or other organizations.

In one embodiment the receiving stations orbit the Earth in orbit of under 3000 km above the Earth's surface. Also in one embodiment the receiving stations are a component of Low Earth Orbit (LEO) satellites. Still in one embodiment the receiving stations orbit the Earth in such a manner that receiving areas of the receiving stations at least temporarily cover geographic regions which are only covered inadequately with ground receiving stations.

In some embodiments the receiving stations orbit the Earth in such a manner that the receiving areas of the receiving stations cover sea, mountain, jungle and/or desert regions. Also in some embodiments the receiving stations are configured in such a manner that the receiving stations receive a 978 MHz Universal Access Transceiver signal. In some embodiments the receiving stations are configured in such a manner that they receive a VHF Data Link Mode-4 signal within a frequency range of from 108 to 137 MHz.

Also in some embodiments the receiving stations have at least one transmitting unit which transmits a further broadcast signal with air traffic information of the aircraft. In some embodiments the receiving stations have at least one transmitting unit which transmits a further broadcast signal with air traffic information of ground-based surveillance units, especially a secondary radar or an ADS-B ground station.

The air traffic information may be position information of at least one aircraft. Also the receiving stations may have means for decrypting a broadcast signal transmitted encrypted by the transmitting station of the aircraft to be managed and/or to be controlled. Also the receiving stations may have means for encrypting the data of the broadcast signal which are to be forwarded to the air traffic management and/or the flight control center.

In another aspect of the invention a method for air traffic management and/or flight control of aircraft is provided, comprising (a) transmitting a 1090 MHz broadcast signal by the at least one transmitting station configured as mode S Extended Squitter of the aircraft to be managed which is received by at least one of a number of receiving stations spaced apart from one another, (b) forwarding by the at least one receiving stations at least a part of the data contained in the broadcast signal to an air traffic management and/or flight control center or to other organizations, and at least a part of the receiving stations are configured as satellite receiving stations, and (c) forwarding by at least one of the satellite receiving stations at least a part of the data contained in the broadcast signal via a radio transmission link to a satellite ground control station and onward to the air traffic management and/or flight control center or to the other organizations.

In one embodiment of the method the data contained in the broadcast signal received by the at least one of the satellite receiving stations is provided to third parties, including at least an airline of the aircraft to be managed and/or to be controlled, to the air traffic management and/or flight control authorities and airports. In another embodiment of the method the air traffic information is position information of at least one aircraft.

DETAILED DESCRIPTION OF THE INVENTION

Figure 1:
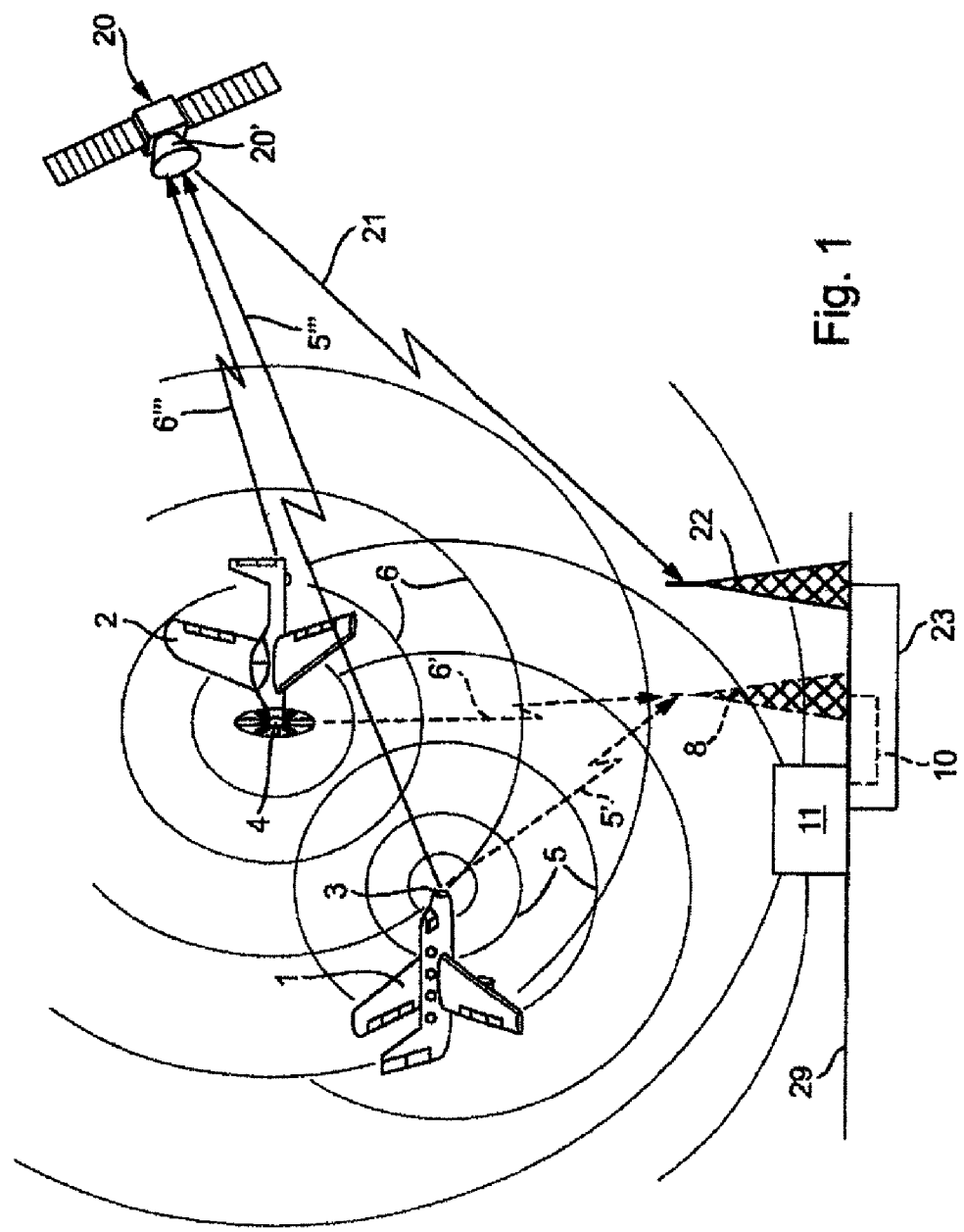
FIG. 1 shows a diagrammatic view of an air traffic management and/or flight control arrangement according to the invention according to a first preferred embodiment.

The invention comprises at least one transmitting station in an aircraft to be managed and/or to be controlled and/or controlled and a plurality of receiving stations which are connected to an air traffic management and/or flight control center. The at least one transmitting station of the aircraft to be managed and/or to be controlled and/or to be controlled transmits a broadcast signal. At least one of the receiving stations receives the broadcast signal and forwards at least a part of the data contained in the broadcast signal to the air traffic management and/or flight control center or other organizations.

The invention also relates to a method for air traffic management and/or flight control of aircraft by means of an air traffic management and/or flight control arrangement of the type mentioned above.

On the basis of the prior art described, the present invention is therefore based on the object of providing the air traffic management and the flight control on the basis of broadcast signals with least possible expenditure and least possible cost globally and area-wide so that the air traffic management and the flight control can be planned on a long-term basis, if possible, and thus also as safely and reliably as possible.

To achieve this object, it is proposed, on the basis of the air traffic management and/or flight control arrangement of the type initially mentioned, that at least a part of the receiving stations is configured as satellite receiving stations which receive the broadcast signal transmitted by the at least one transmitting station of the aircraft to be managed and/or to be controlled and/or controlled and forward at least a part of the data contained therein via a radio transmission link to a satellite ground control station and onward to the air traffic management and/or flight control center or other organizations.

The present invention relates to aircraft of all types which transmit an arbitrary broadcast signal and are equipped with one or more suitable transmitters: civil and military aircraft of all types, for example transport planes, aircraft of general aviation, manned and even unmanned aircraft and aviation systems.

The present invention provides for space-based air traffic management, flight surveillance and/or flight control in that satellite-based receiving stations are used which receive the broadcast signal transmitted by the aircraft. The receiving stations do not need to be a component of a separate satellite but can be attached, for example, in the form of a so-called piggyback to a satellite which is actually used for other tasks (for example for information transmission, for global positioning and/or locating aircraft, land or water vehicles, etc.).

The satellite receiving stations can be configured as sole receiving stations of the air traffic management and/or flight control arrangement according to the invention in which case ground-based receiving stations can then be dispensed with. As an alternative, the satellite receiving stations can also be used for supplementing an existing infrastructure with ground-based receiving stations, the satellite receiving stations preferably covering regions in which no ground receiving stations are arranged.

The broadcast signal of an aircraft, received by the receiving stations, can be preprocessed and/or edited for the transmission to the air traffic management and/or flight control center. At least a part of the data and information contained in the received broadcast signal is transmitted from the satellite receiving station to one or more satellite ground control stations where it is processed and then forwarded to the air traffic management and/or flight control center or other authorized organizations (e.g. airlines, airports, etc.). The ground control station receiving the satellite signal transmits the data to the air traffic management and/or flight control center or to the other authorized organization via lines or by other means, for example via a radio link.

The connection between the satellite receiving station which has received the broadcast signal from the aircraft to be managed and/or to be controlled and/or controlled, and the satellite ground control station does not need to be direct. It is conceivable that the connection between the satellite station and the ground control station takes place via suitable relay stations, particularly in the form of satellite relay stations (so-called inter-satellite links). This has the advantage that signal delays are reduced.

By means of the present invention, it is possible to achieve a global coverage for the purpose of air traffic management, flight surveillance and/or flight control by means of broadcast signals in an especially simple and cost-effective manner. Thanks to the invention, especially the regions above seas and oceans but also regions with dense jungle, steep mountains or great deserts can be monitored area-wide up to low altitudes. This has the advantage that, for example, aircraft on their flight from Central or South America to Europe can be continuously monitored during their flight over the Atlantic Ocean even though there are no ground receiving stations there. As a result, information about the international aircraft on their way to Europe can be provided early, for example to the air traffic management authority of Portugal (NAV Portugal) which is responsible for the approach over the Atlantic from Central and South America. The aviation authority of Portugal is thus able to include an international aircraft into the planning of the air traffic management and/or flight control activities already long before it reaches the Portuguese surveillance area so that regional aircraft can be controlled early and in a forward-looking manner. This equalizes flight management in time, especially with regard to taking into consideration both regional and international aircraft with prioritization of the international aircraft as a result of which the efficiency, safety and reliability of the air traffic management and/or flight control activities, and thus the capacity for air traffic control, can be distinctly improved. In addition, the required diversions of national aircraft can be reduced to a minimum which results in a saving of fuel and a reduction of noise and exhaust gases.

A further advantage of the air traffic management and flight control arrangement according to the invention can be seen in the fact that now information about the aircraft and its flying route is available during the entire flight of an aircraft, especially also during the flight over regions in which there is no radar coverage and no ADS-B ground receiving stations are arranged. This information can be provided to third parties free of charge or against payment of a fee. It is thus conceivable, for example, that airlines are informed about the current position of their aircraft. This additionally available information can also be of interest to airports since they can use this information for online updating of the arrival and/or departure plans.

A further advantage of the present invention can be seen in the fact that the satellite-based receiving stations of the air traffic management and/or flight control arrangement according to the invention comprise a much greater range of coverage than the known ground-based receiving stations. Radar surveillance of the airspace is expensive which is the main reason why radar installations for flight surveillance currently only cover a small part of the world (the inventor estimates less than 5% of the land masses). Due to the curvature of the Earth, ADS-B ground receiving stations only have a relatively restricted range of surveillance. For the area-wide coverage of the upper airspace of Australia, which corresponds to a surveillance of the airspace above 30 000 feet, about 30 ADS-B ground stations are sufficient. However, an area-wide surveillance of the entire air traffic in the USA requires approx. 1500 ADS-B ground receiving stations which must be erected and used distributed over the entire USA.

Relocating the receiving stations into space makes it possible to distinctly enlarge the surveillance area of an individual receiving station so that the number of receiving stations required for implementing airspace surveillance in a particular region can be reduced. In addition, the satellite receiving stations allow not only the upper airspace to be monitored (above flight level FL200 or FL 300, respectively), but airspace surveillance down to low flying altitudes and also to the ground (so-called FL0). This means that by means of the air traffic management and/or flight control arrangement according to the invention, air traffic management and/or flight control can be achieved down to FL0 with relatively little expenditure. It is the aim of the invention, in particular, to implement a global ADS-B coverage by means of satellite-based ADS-B receiving stations so that global airspace surveillance without radar and/or ADS-B ground stations is possible.

To implement the present invention, a constellation of a number of satellites orbiting the Earth in proximity to the Earth is needed since the broadcast signal transmitted by the aircraft only has a limited range. In addition, the broadcast signal in the aircraft is currently only radiated downward, toward the front and toward the rear (but not upward). This means that the broadcast signal can be received rather poorly by a satellite positioned directly above the aircraft. To receive the broadcast signal, therefore, the satellite receiving stations preferably arranged obliquely above the aircraft, especially located on the horizon, are used. Naturally, it is also conceivable that in future aircraft will also be equipped with transmitters which radiate the broadcast signal upward, especially if the satellite-based surveillance system proposed according to the invention should be successful. The reception of the broadcast signals of an aircraft from satellites located directly above the aircraft is possible without problems at least when the transmitting stations are arranged on the top of aircraft.

The frequencies and the transmitting power of the broadcast signal can also change in future ADS-B systems compared with current surveillance systems. However, the principle of the unaddressed periodic radiation of the broadcast signal is also retained in future ADS-B systems.

According to an advantageous development of the present invention, it is proposed that the satellite receiving stations orbit the Earth on an orbit of less than 3000 km above the Earth's surface. Thus, according to this development, no geostationary satellites are used since their orbit has a relatively large distance from the Earth's surface (approx. 36 000 km), but satellites close to the Earth. The satellite receiving stations are preferably a component of so-called Low Earth Orbit (LEO) satellites. The satellites are positioned in an orbit of about 160-2000 km above the Earth's surface. In particular, the receiving stations can be used in satellites in an orbit of about 600-900 km above the Earth's surface. The decisive factor is here that the broadcast signal transmitted by the transmitting stations of the aircraft can still be received safely and reliably by the satellite receiving stations (even under unfavorable conditions). It is emphasized, however, that the present invention can be implemented by means of any satellites and is not restricted to satellites of a particular orbit. If the conventional broadcast signal can only be received weakly by satellites in higher orbits, it would be conceivable that the aircraft transmit a broadcast signal with a higher transmitting power, amplified compared with the conventional signal, or the transmitters in the aircraft are positioned in such a manner, for example on the top of the aircraft, that the reception of the broadcast signal by satellite receiving stations is improved and thus can also be received without problems by satellites in medium Earth orbits (e.g. Galileo satellites) and by geostationary satellites.

According to a preferred embodiment of the present invention, it is proposed that the satellite receiving stations orbit the Earth in such a manner that their areas of reception cover at least temporarily geographic regions which are only inadequately covered with ground receiving stations. The satellite receiving stations advantageously orbit the Earth in such a manner that their areas of reception also cover sea, mountain, jungle and/or desert regions.

According to another advantageous development of the present invention, it is proposed that the satellite receiving stations are configured in such a manner that they receive a broadcast signal of a transmitting station, configured as Mode S 1090 MHz Extended Squitter, of an aircraft to be managed and/or to be controlled and/or to be controlled. As an alternative or additionally, the satellite receiving stations can also be configured in such a manner that they receive a 978 MHz Universal Access Transceiver (UAT) signal. Finally, the satellite receiving stations can also be configured, as an alternative or additionally, in such a manner that they receive a VHF Data Link Mode 4 (VDLM 4) signal in the 108 to 137 MHz frequency band.

According to yet another advantageous development of the present invention, it is proposed that the satellite receiving stations have at least one transmitting unit which transmits a further broadcast signal with information about the position of aircraft. By means of this development, a so-called Traffic Information Services-Broadcast (TIS-B) can be implemented by means of which aircraft equipped with ADS-B can be supplied with a more complete image of the surrounding airspace. TIS-B is a service which supplies aircraft equipped with ADS-B with surveillance data about aircraft not equipped with ADS-B. TIS-B comprises surveillance information which is provided by one or more surveillance sources such as, for example, by a surveillance radar. The surveillance information is processed and converted so that it can be used by aircraft equipped with ADS-B.

TIS-B can also be used in ADS-B applications comprising a number of ADS-B data links in order to provide cross-networking or a gateway function between the aircraft equipped with ADS-B by using the various data links. This TIS-B subfunction is also called Automatic Dependent Surveillance Rebroadcast (ADS-R). Hitherto, two communication link protocols have been licensed for the use in ADS-R applications. These are Universal Access Transceiver (UAT) which is used in most cases by small aircraft, and the 1090 MHz Mode S Extended Squitter (1090 ES) which is normally used in aircraft for commercial use.

In order to prevent interception and further exploitation of the broadcast signal by unauthorized persons, it is proposed, according to a preferred embodiment of the invention, that the satellite receiving stations have means for decrypting a broadcast signal transmitted encrypted by the transmitting station of the aircraft to be managed and/or to be controlled and/or to be controlled. The encrypted transmission of the broadcast signal can represent a possible development within the context of ADS-B. Naturally, other developments of ADS-B are also conceivable which should also be comprised by the present invention. According to this embodiment, the broadcast signals cannot be received by arbitrary receiving stations and information contained therein cannot be extracted. Instead, the broadcast signal is transmitted encrypted so that it can be received and decrypted only by receiving stations equipped with corresponding decrypting mechanisms.

To prevent an interception of the data transmitted via the radio transmission link between the satellite receiving station which has received the broadcast signal and the satellite ground control stations by unauthorized third parties, it is proposed that the satellite receiving stations have means for encrypting the data of the broadcast signal to be forwarded to the air traffic management and/or flight control center. The encrypted data are transmitted by the satellite receiving station either directly or indirectly via relay stations to one of the satellite ground control stations.

As a further solution to the task of the present invention, it is proposed, on the basis of the method for air traffic management and/or flight control of aircraft of the type initially mentioned that at least a part of the receiving stations is configured as satellite receiving stations, wherein the broadcast signal transmitted by the at least one transmitting station of the aircraft to be managed and/or to be controlled and/or to be controlled is received by at least one of the satellite receiving stations and at least a part of the data contained in the broadcast signal is forwarded via a radio transmission link to a satellite ground control station and onward to the air traffic management and/or flight control center or other organizations.

Finally, it is proposed that the data contained in the broadcast signal received by the at least one satellite receiving station are provided to third parties, particularly an airline of the aircraft to be managed and/or to be controlled and/or to be controlled, air traffic management and/or flight control authorities and airports. In this manner, for example the airline always has current position and status information for all its aircraft or, respectively, for the ADS-B-capable aircraft. Thus, the airline can monitor and control the use and the availability of its aircraft in a much better way than has previously been possible. As a result, the efficiency of the aircraft can be enhanced. This is only possible by means of the present invention since it is only by means of this invention that global surveillance of the air traffic is possible at all, especially in the area of the seas and oceans and also of the polar regions.

Figure 3:
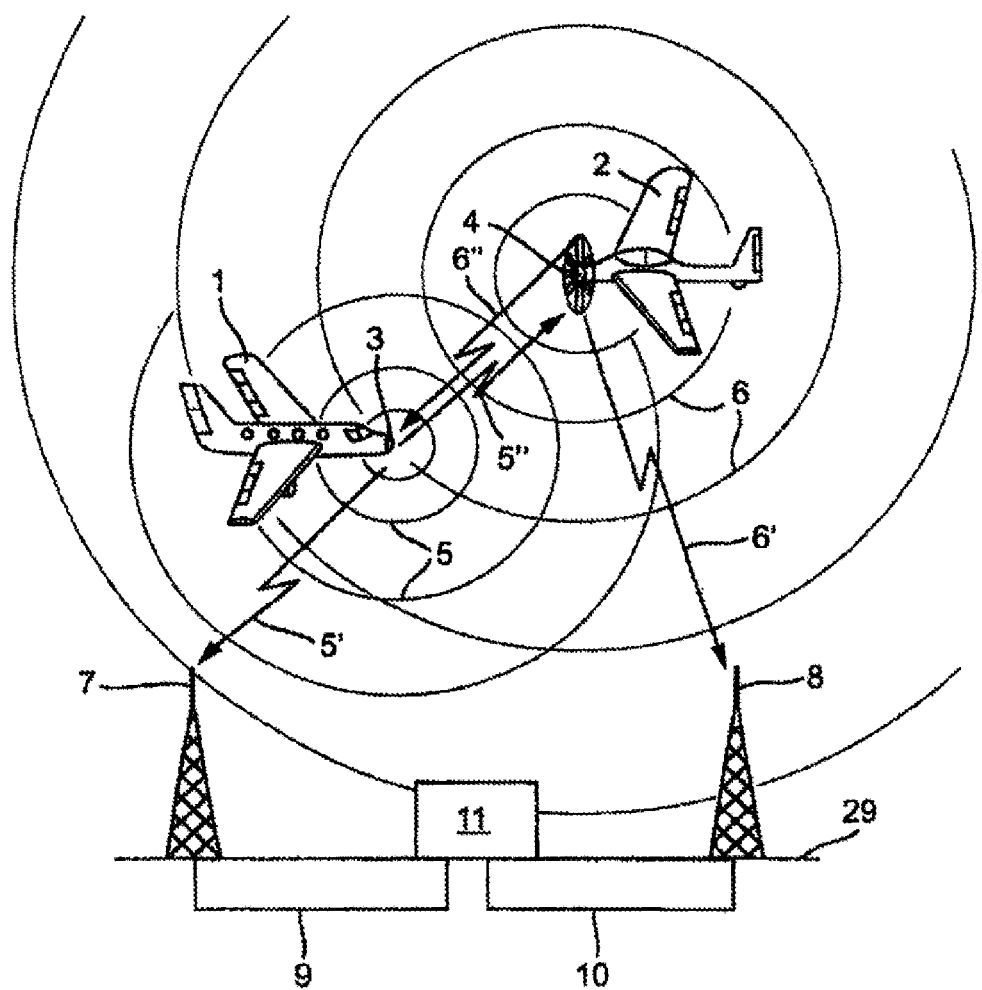
FIG. 3 shows in a diagrammatic view an air traffic management and/or flight control arrangement known from the prior art.

Preferred exemplary embodiments of the present invention will be explained in greater detail by means of the figures as attached, in which:

FIG. 3 shows an air traffic management and/or flight control arrangement known from the prior art. The arrangement is used for air traffic management and/or flight control of aircraft 1, 2, particularly aircraft. In the aircraft 1, 2, at least one transmitting station 3, 4 is arranged in each case. The transmitting stations 3, 4 regularly transmit a broadcast signal, in the form of a 1090 MHz Mode S Extended Squitter signal (1090 ES) in the exemplary embodiment shown, which signal can be received by any receiving stations. To illustrate the broadcast characteristics of the 1090 ES signal, concentric circles are drawn around the transmitting stations 3, 4 in FIG. 3. These circles correspond to a first 1090 ES signal 5 of a first transmitting station 3 and to a second 1090 ES signal 6 of a second transmitting station 4. Such an air traffic management and/or flight control arrangement is known by the name Automatic Dependent Surveillance-Broadcast (ADS-B) in the prior art.

The known ADS-B arrangement also comprises a number of receiving stations spaced apart from one another and arranged on the ground, of which only two receiving stations 7, 8 are shown by way of example in FIG. 3. The receiving stations 7, 8 are connected via connecting lines 9, 10 to an air traffic management and/or flight control center 11. As an alternative or additionally, the receiving stations 7, 8 can also be connected by radio or in any other way to the air traffic management and/or flight control center 11. The center 11 is operated or managed, respectively, by a national or regional air traffic management authority, for example the Deutsche Flugsicherung (DFS) or the Maastricht Upper Area Control (MUAC).

As has been mentioned, the aircraft 1, 2 transmit regularly, on their own initiative and without addressing a special receiver address or a special receiver, broadcast signals 5, 6. The 1090 ES signal 5, 6 contains information relating to the aircraft 1; 2 which transmits the signal 5; 6. The information comprises, for example, the position, the altitude, the speed, the flight direction, the departure point, the destination point, the call signal, the aircraft class, etc. of the aircraft 1; 2. The altitude and the speed of the aircraft 1, 2 is determined by means of suitable detection devices on board the aircraft 1, 2. The position of the aircraft 1, 2 is determined by means of suitable, preferably satellite-based positioning systems, for example by means of Global Positioning System (GPS) satellites. In this context, suitable facilities (e.g. a satellite receiving antenna, computing means etc.) for satellite-based positioning of the aircraft 1, 2 must be present on board the aircraft 1, 2. As an alternative, the positioning of the aircraft 1, 2 can also be carried out by means of other global navigation satellite systems (GNSS), for example GLONASS satellites (the Russian counterpart to the American NAVSTAR-GPS), by means of Galileo satellites or by means of Compass satellites including their improvement systems (WAAS, EGNOS, MTSAT, GAGAN, etc.). It is of no significance how the position of the aircraft 1, 2 is lastly determined. The decisive factor is that apart from other information relating to the aircraft 1; 2 including the current flight characteristics, the current position of the aircraft 1, 2 is also transmitted via the 1090 ES broadcast signal 5, 6.

The broadcast signals 5, 6 transmitted by the transmitting units 3, 4 are also received by the ground receiving stations 7, 8, among others (compare arrows 5' and 6'). It is expressly pointed out that the arrows 5' and 6' drawn as illustration do not mean that a point-to-point connection is formed between the transmitting stations 3, 4 and the receiving stations 7, 8. Quite the contrary, the signals 5, 6 are broadcast signals which can be received by anybody. At least a part of the information relating to the aircraft 1, 2, contained in the received broadcast signals 5, 6, is transmitted to the air traffic management and/or flight control center 11 or other organizations via the connecting lines 9, 10, where they are available for further processing. By means of the information available in the center 11, a so-called air-to-air surveillance application (ASA) and an air-to-ground surveillance application (GSA) can be implemented with high accuracy.

FIG. 1 shows a diagrammatic view of an air traffic management and/or flight control arrangement according to the invention according to a first preferred embodiment of the present invention. Identical elements or components of the arrangement according to the invention are provided with the same reference symbols as in the known arrangement shown in FIG. 3. A significant difference of the air traffic management and/or flight control arrangement according to the invention in comparison with the prior art consists in that at least a part of the receiving stations is no longer arranged on the ground but in space.

For example, FIG. 1 only shows one satellite receiving station 20, but naturally, the arrangement according to the invention can also comprise significantly more satellite receiving stations 20. The satellite receiving station 20 shown in FIG. 1 comprises a transmitting/receiving antenna 20' and a suitable processing and computing unit (not shown) for processing the received 1090 ES broadcast signals 5, 6. The reception of the broadcast signals 5, 6 transmitted by the transmitting stations 3 and 4, respectively, by the satellite receiving station 20 is symbolically illustrated by arrows 5''' and 6''' in FIG. 1. The broadcast signals 5, 6 received, or the ADS-B information contained therein, are forwarded by the satellite receiving station 20 via a radio transmission link 21 to a satellite ground control station 22. There the ADS-S data are processed and edited for forwarding to the air traffic management and/or flight control center 11 via a connection 23.

In the embodiment according to the invention too, it is naturally possible that the broadcast signal 5; 6 transmitted by one of the aircraft 1, 2 is received by another aircraft 2; 1 and evaluated there. The information regarding the other aircraft 1; 2, received in the other aircraft 2; 1, can be used for implementing a system for preventing collisions between aircraft 1, 2, for example in the form a Traffic Collision Avoidance System (TCAS).

The surveillance arrangement according to the invention provides means for implementing a space-based ADS-B surveillance by using satellite receiving stations 20 which receive 1090 ES signals 5, 6 from aircraft 1, 2. Furthermore, the arrangement can also provide an ADS-B Rebroadcast (ADS-R), a Traffic Information Service Broadcast (TIS-B) and a Flight Information Broadcast (FIS-B) by using the 1090 ES signal 5, 6 via satellite receiving stations 20.

The space-based ADS-B surveillance can supplement or improve an existing ground-based ADS-B surveillance (with ground receiving stations 7, 8). A corresponding ground-based receiving station 8, shown by way of example, for receiving ADS-B broadcast signals 5', 6' is shown dashed in FIG. 1. As an alternative, a global ADS-B surveillance which comprises satellite receiving stations 20 as only receiving stations, i.e. no additional ground-based receiving stations 8, can be implemented according to the invention.

In addition to air traffic management and/or flight control functions (so-called Air Traffic Control (ATC) tasks), the received ADS-B data can be provided to other users and used by them. It is thus conceivable, for example, to use the ADS-B information also for providing to an airline the current position of its aircraft 1, 2. This can be helpful in the case of delays of airliners 1, 2 or in the case of an emergency. As a result, the airline can plan the use of its aircraft in a much better, more predictory and more efficient manner.

ADS-B comprises a regular, unrequested transmission of data or information with respect to an aircraft 1; 2 which is available on board the aircraft 1, 2. The information transmitted comprises surveillance data such as, for example, the position, the altitude, the speed, the direction, a call signal of the aircraft 1, 2, the aircraft class and others. ADS-B signals 5, 6 are transmitted spontaneously, independently, regularly and without a special receiving address. To this extent, the ADS-B signals differ from ADS-Contract (ADS-C) messages which are transmitted via a point-to-point connection to geostationary communication satellites. The geostationary communication satellites are located in an orbit of some 10 000 meters above the Earth's surface 29, particularly at about 36 000 kilometers above the Earth's surface 29. The point-to-point communication link is chargeable and relatively expensive so that relatively high costs arise for the transmission of the information of an aircraft 1, 2 during a relatively long intercontinental flight, if only due to the required transmission times for the aircraft information, which would not be accepted by the airlines and lastly by the users of the aircraft 1, 2 (the passengers or the airfreight customers). Compared with the ADS-C surveillance of the airspace, the space-based ADS-B surveillance proposed according to the invention offers distinct advantages with regard to a simple and cost-effective surveillance of the aircraft 1, 2 as is possible.

Finally, the present invention also allows so-called air-to-ground surveillance applications (GSA) to be implemented in regions which are not covered by primary and/or secondary radar. Even without radar coverage, an ATC surveillance can be implemented in these regions by means of the space-based ADS-B surveillance according to the invention. This is of interest especially in regions where ADS-B ground receiving stations 7, 8 can only be arranged with great expenditure or even not at all.

By means of the present invention, it is also possible for the first time to continuously monitor the airspace even at lower flight altitudes. A surveillance may possibly be implemented which can reach down to the Earth's surface 29, for example down to the runway of an airport. This is achieved by the fact that the satellite receiving stations 20 are located above the aircraft 1, 2 and—differently from the previously used radar and ADS-B ground receiving station 7, 8—are not terrestrial systems which can be impeded due to the Earth's curvature and also by obstacles, for example buildings, vegetation or hills and mountains, from receiving the broadcast signals 5, 6.

Like the terrestrial ADS-B surveillance, the space-based ADS-B system proposed according to the invention could also become an essential component of the US next Generation Air Transportation System (NextGen), of the Australian Air Traffic Surveillance System and of corresponding other systems in Europe, Asia and other parts of the world. It must be assumed that the space-based ADS-B surveillance will become a decisive component of the air traffic surveillance in the world in future. The invention provides an improved surveillance of the aircraft 1, 2 in airspace and an improved finding about the current air traffic in the surrounding airspace both for pilots and for air traffic controllers. The space-based ADS-B is designed for improving the safety, the capacity and the efficiency of the regional air surveillance systems and, at the same time, providing a flexible platform which can be extended without great effort in order to take into consideration possibilities for future growth in air traffic.

By using satellite receiving stations 20, the advantages of an ADS-B can be implemented that problem free and cost-effectively even for those regions in which an ADS-B surveillance could previously be implemented only with great expenditure or not at all, for example in the area of seas or oceans or in regions having a weak infrastructure. In addition to the air traffic surveillance functions, a global surveillance of their own aviation fleet can be provided to the airline.

Figure 2:
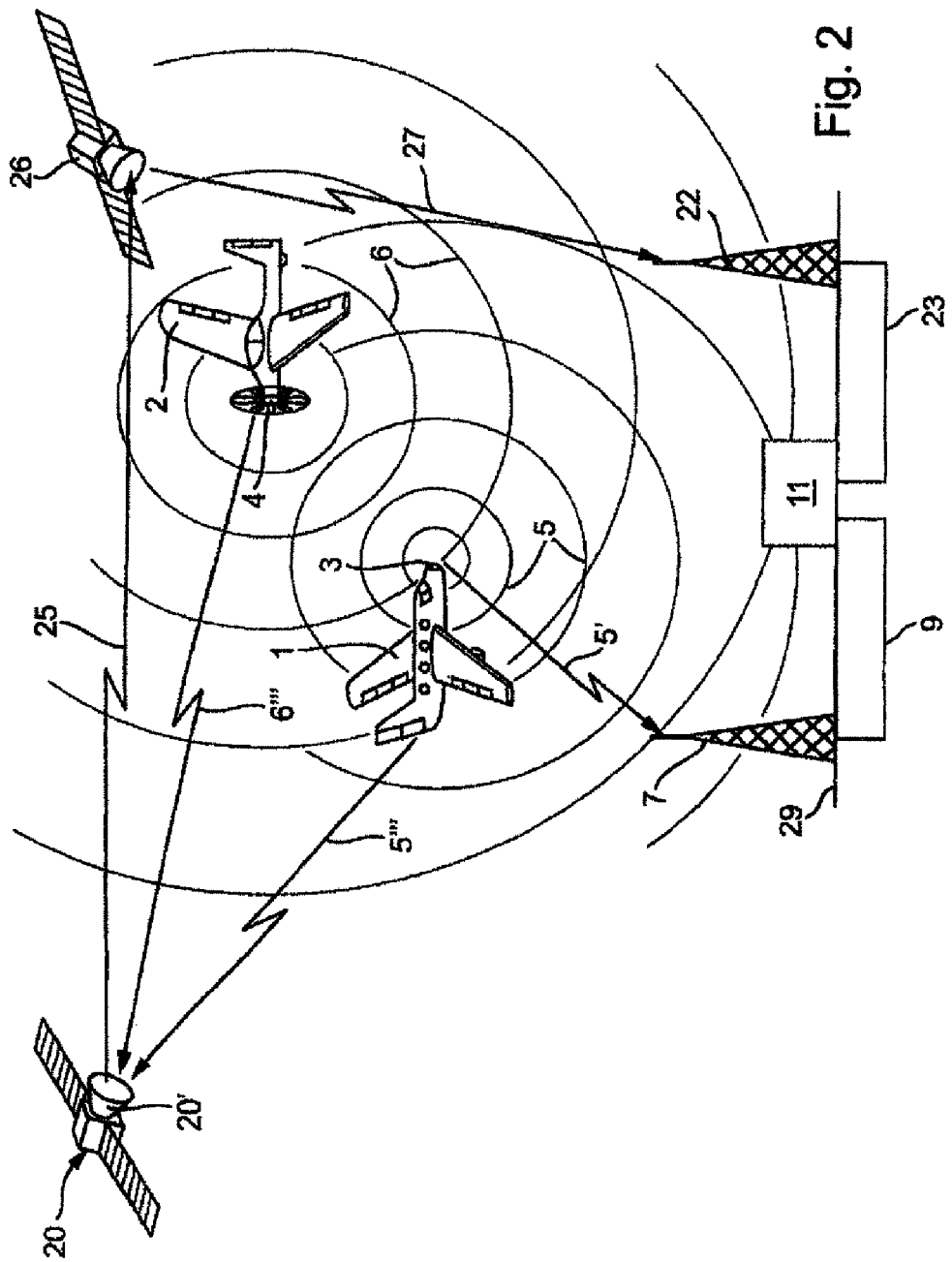
FIG. 2 shows a diagrammatic view of an air traffic management and/or flight control arrangement according to the invention according to a second preferred embodiment.

FIG. 2 shows a further preferred exemplary embodiment of the present invention. This exemplary embodiment differs from the first exemplary embodiment from FIG. 1 especially in that the broadcast signals 5, 6 received by the satellite receiving station 20 or the information contained therein is not transmitted directly back to the Earth's surface (to the satellite ground control station 22) by the satellite receiving station 20 but first to another satellite 26 via a radio link 25. The broadcast signal 5, 6 received by the satellite receiving station 20 and the information contained therein can be transmitted from the further satellite 26 either again to other satellites (not shown), or to the satellite ground control station 22. The further satellite 26 can also comprise a receiving station for the 1090 ES broadcast signals 5, 6 of the aircraft 1, 2. However, it is also conceivable that the further satellite 26—as in the exemplary embodiment shown in FIG. 2—is simply used as relay station for receiving the signals from the satellite receiving station 20 via the radio link 25 and for forwarding the information contained in the signal to the satellite ground control station 22 without the satellite 26 itself being able to receive 1090 ES broadcast signals 5, 6 transmitted by the aircraft 1, 2.

In the exemplary embodiment shown in FIG. 2, the broadcast signals 5, 6 or the information contained therein are/is transmitted via a radio link 27 from the satellite 26 to the satellite ground control station 22. The information about the aircraft 1, 2, received via the radio link 27, which was contained in the broadcast signals 5′″, 6′″ received by the satellite receiving station 20 is transmitted by the ground control station 22 via a line 23 to the air traffic management and/or flight control center 11. As an alternative, a radio transmission between the ground control station 22 and the center 11 would also be conceivable.

The transmission of the broadcast signals 5′″, 6′″ received by a satellite receiving station 20 to the air traffic management and/or flight control center 11 indirectly via further satellites 26 is advantageous, especially in regions in which the next satellite ground control station 22 for receiving the radio signals 27 is arranged out of range of the satellite 20 receiving the broadcast signals 5′″, 6′″, such as, for example, in the area of seas and oceans.

The invention claimed is:

1. An air traffic management and/or flight control arrangement for aircraft, comprising;
   at least one transmitting station in an aircraft to be managed; and
   a number of receiving stations spaced apart from one another which are connected to an air traffic management and/or a flight control center;
   wherein the at least one transmitting station of the aircraft to be managed and/or to be controlled transmits a broadcast signal, at least one of the receiving stations receives the broadcast signal and forwards at least a part of the data contained in the broadcast signal to the air traffic management and/or the flight control center or other organizations, characterized in that at least some of the receiving stations are configured as satellite receiving stations in such a manner that they receive a 1090 MHz broadcast signal of a transmitting station, configured as Mode S Extended Squitter, of the aircraft to be managed, and forward at least a part of the data contained in the broadcast signal via a radio transmission link to a satellite ground control station and onward to the air traffic management and/or the flight control center or other organizations.

2. The arrangement as claimed in claim 1, characterized in that the satellite receiving stations orbit the Earth in orbit of under 3000 km above the Earth's surface.

3. The arrangement as claimed in claim 2, characterized in that the satellite receiving stations are a component of Low Earth Orbit (LEO) satellites.

4. The arrangement as claimed in claim 1, characterized in that the satellite receiving stations orbit the Earth in such a manner that receiving areas of the receiving stations at least temporarily cover geographic regions which are only covered inadequately with ground receiving stations.

5. The arrangement as claimed in claim 4, characterized in that the satellite receiving stations orbit the Earth in such a manner that the receiving areas of the receiving stations cover sea, mountain, jungle and/or desert regions.

6. The arrangement as claimed in claim 1, characterized in that the receiving stations are configured in such a manner that the receiving stations receive a 978 MHz Universal Access Transceiver signal.

7. The arrangement as claimed in claim 1, characterized in that the satellite receiving stations are configured in such a manner that they receive a VHF Data Link Mode-4 signal within a frequency range of from 108 to 137 MHz.

8. The arrangement as claimed in claim 1, characterized in that the satellite receiving stations have at least one transmitting unit which transmits a further broadcast signal with air traffic information of the aircraft.

9. The arrangement as claimed in claim 8, characterized in that the satellite receiving stations have at least one transmitting unit which transmits a further broadcast signal with air traffic information of ground-based surveillance units, especially a secondary radar or an ADS-B ground station.

10. The arrangement as claimed in claim 9, characterized in that the air traffic information is position information of at least one aircraft.

11. The arrangement as claimed in claim 8, characterized in that the air traffic information is position information of at least one aircraft.

12. The arrangement as claimed in claim 1, characterized in that the satellite receiving stations have means for decrypting a broadcast signal transmitted encrypted by the transmitting station of the aircraft to be managed and/or to be controlled.

13. The arrangement as claimed in claim 1, characterized in that the satellite receiving stations have means for encrypting the data of the broadcast signal which are to be forwarded to the air traffic management and/or the flight control center.

14. A method for air traffic management and/or flight control of aircraft,
wherein at least one transmitting station in an aircraft to be managed and/or to be controlled transmits a 1090 MHz broadcast signal which is received by at least one of a number of receiving stations spaced apart from one another which forwards at least a part of the data contained in the broadcast signal to an aircraft management and/or flight control center or to other organizations, characterized in that some of the receiving stations are configured as satellite receiving stations, wherein a 1090 MHz broadcast signal transmitted by at least one transmitting station, configured as mode S Extended Squitter, of the aircraft to be managed and/or to be controlled is received by at least one of the satellite receiving stations and at least a part of the data contained in the broadcast signal is forwarded via a radio transmission link to a satellite ground control station and onward to the air traffic management and/or flight control center or to other organizations.

15. The method of claim 14, characterized in that the data contained in the broadcast signal received by the at least one of the satellite receiving stations is provided to third parties, including at least an airline of the aircraft to be managed and/or to be controlled, to the air traffic management and/or flight control authorities and airports.

16. One of a number of receiving stations of an aircraft management and/or flight control arrangement for aircraft, the receiving stations being spaced apart from one another and connected to an aircraft management and/or flight control center, the one receiving station being embodied as a satellite-based receiving station and adapted to receive a 1090 MHz broadcast signal of a transmitting station of an aircraft to be managed and/or to be controlled, the broadcast signal being configured as Mode S Extended Squitter, the one receiving station being further adapted to forward at least a part of the data contained in the received broadcast signal via a radio transmission link to a satellite ground control station and onward to the air traffic management and/or the flight control center or other organizations.

* * * * *